United States Patent [19] [11] 4,277,294
Orcutt [45] Jul. 7, 1981

[54] METHOD OF FABRICATING WINDOW PANELS, PARTICULARLY CURVED PANELS

[75] Inventor: Dee R. Orcutt, Huntsville, Ala.

[73] Assignee: PPG Industries, Inc., Pittsburgh, Pa.

[21] Appl. No.: 46,150

[22] Filed: Jun. 6, 1979

[51] Int. Cl.³ .................. B32B 17/10; B32B 31/20; C03C 27/04
[52] U.S. Cl. .................. 156/102; 156/99; 156/103; 156/106; 428/34; 428/192; 428/437; 428/425.6; 428/425.8
[58] Field of Search ............... 156/102, 99, 103, 106; 428/34, 192, 437, 425.6, 425.8

[56] References Cited
U.S. PATENT DOCUMENTS

| 2,511,168 | 6/1950 | Martin | 156/99 |
| 3,061,490 | 10/1962 | Ryan | 156/99 |
| 3,248,273 | 4/1966 | Boicey | 156/99 |
| 3,259,345 | 7/1966 | Martignoni | 156/99 |
| 3,317,710 | 5/1967 | Boicey | 219/545 |
| 3,410,739 | 11/1968 | Orcutt | 156/106 |
| 3,616,122 | 10/1971 | Orcutt | 156/106 |
| 3,885,072 | 5/1975 | Zibritosky | 156/109 |
| 3,919,022 | 2/1974 | Stefanik | 156/106 |

Primary Examiner—Ellis P. Robinson
Attorney, Agent, or Firm—Edward I. Mates

[57] ABSTRACT

Fabricating a panel comprising a rigid mounting frame surrounding a laminated transparency having a metal reinforcing insert embedded therein in such a manner that the insert is parallel to the outer major surface of the transparency after its fabrication.

8 Claims, 4 Drawing Figures

U.S. Patent  Jul. 7, 1981  4,277,294
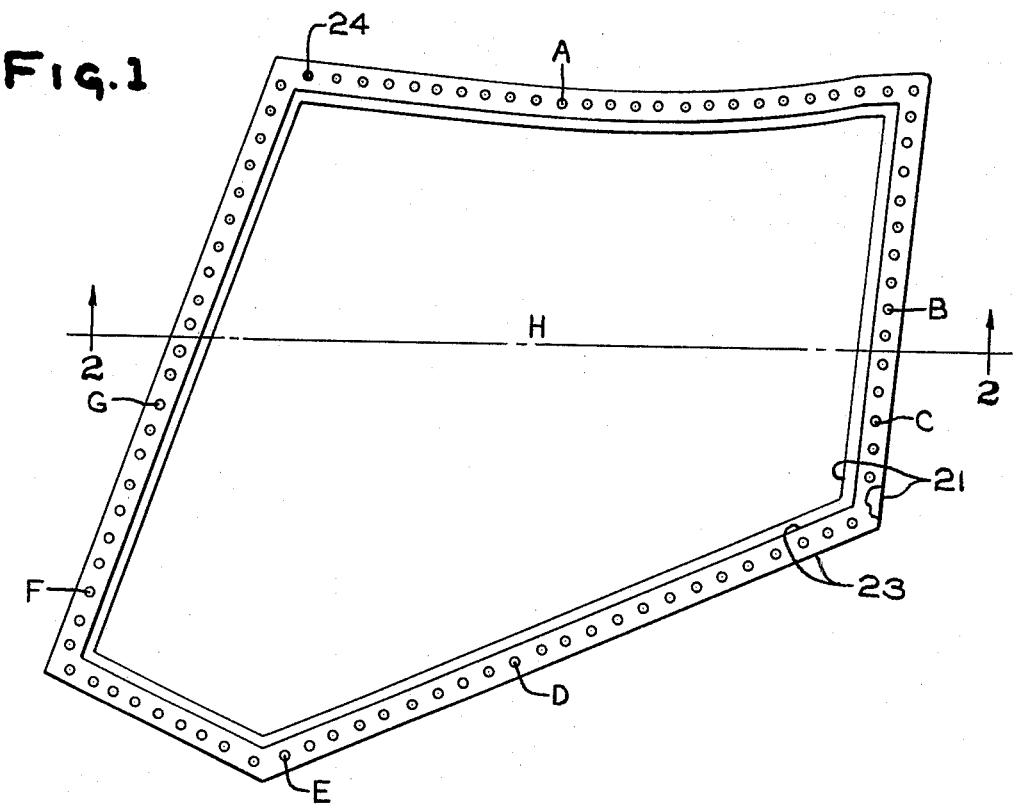
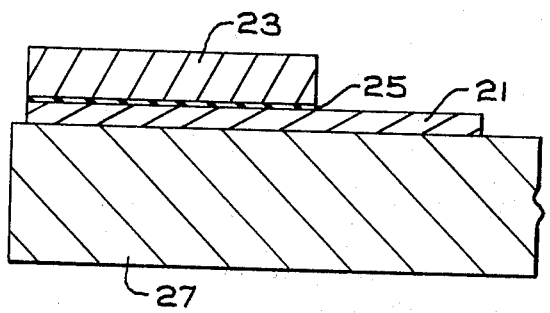
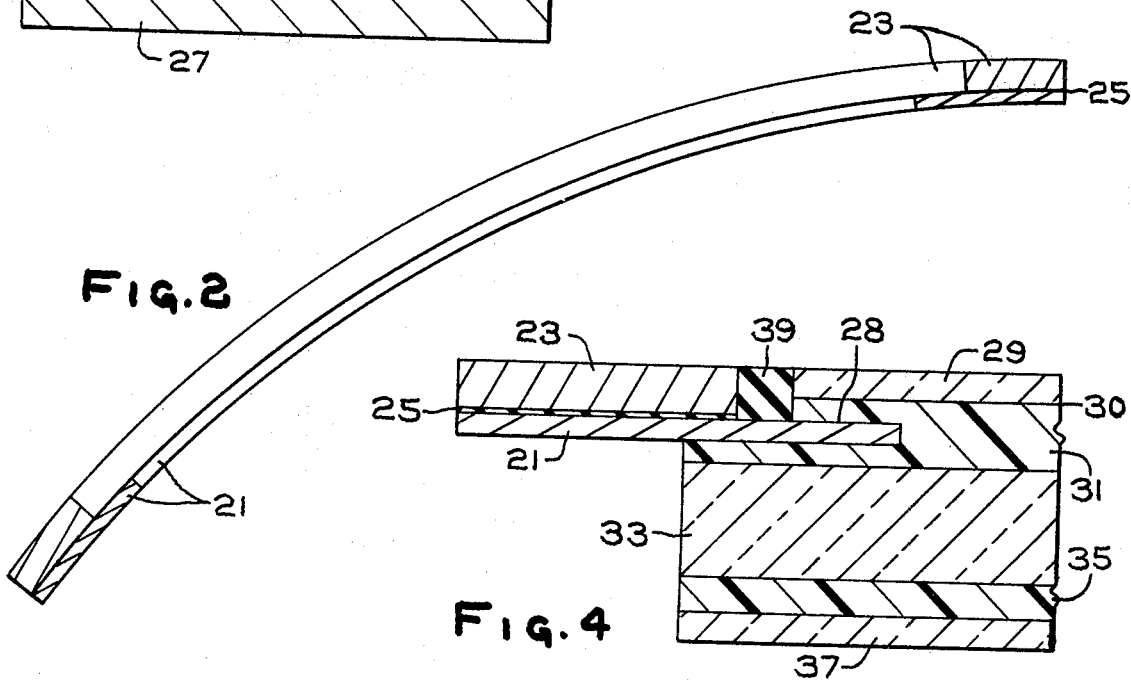
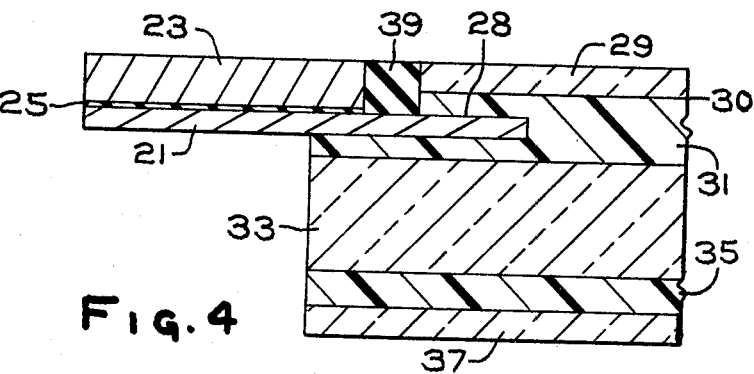

METHOD OF FABRICATING WINDOW PANELS, PARTICULARLY CURVED PANELS

BACKGROUND OF THE INVENTION

This invention relates to a method of fabricating window panels, particularly curved panels used in aircraft. Such panels usually comprise a rigid metal mounting frame surrounding a transparency. The transparency is usually a laminated window and comprises at least two rigid sheets of transparent material selected from the group consisting of glass, polycarbonate, acrylic resins and hard polyurethanes, (which will be referred to as "glass" in order to simplify this specification) and a layer of thermoplastic interlayer material bonding adjacent of said rigid sheets together. The thermoplastic interlayer material may be composed of a plasticized polyvinyl acetal such as polyvinyl butyral or it may be composed of a polyurethane and, regardless of its composition, will be referred to as an "interlayer". A metal reinforcing insert has an interior portion embedded within the thickness of an interlayer at a predetermined distance in the direction of the thickness of said transparency from the outboard surface thereof. The metal reinforcing insert (usually an aluminum frame) extends outward into an outer portion that is attached to the mounting frame. Usually, the outer portion of the reinforcing insert and the outer metal mounting frame have aligned apertures which are adapted to receive attachment bolts that attach the panel to an aircraft body.

It is traditional in the fabrication of aircraft windshields to assemble the components of the transparency which includes two or more sheets of glass with intervening interlayers of flexible and compressive material interposed between adjacent glass layer. The interlayers comprise a plurality of plies. In one of the interlayers used to bond adjacent glass sheets of different outline configurations, the plies of interlayer material adjacent one of said adjacent glass sheets conform in outline to that of said one glass sheet and the plies of interlayer adjacent the other said adjacent glass sheets conform in outline to that of the other adjacent glass sheet. If a reinforcing insert is embedded between the outer portions of the adjacent glass sheets, plies of the interlayer whose perimeter conforms to the inner perimeter edge of the reinforcing insert are disposed in alignment with the thickness of the insert and intermediate the other plies of the interlayer. When an assembly containing such a reinforcing insert disposed within the thickness of one of the interlayers is subjected to heat and pressure for lamination, the flexibility of the interlayer plies permits the reinforcing insert to move, tilt and deflect somewhat so that its different portions move in the direction of the thickness of the interlayer for different distances during lamination. Therefore, the laminated transparency which contains an extended outer portion of the reinforcing insert, which outer portion was later attached to the metal mounting frame according to the method performed prior to the present invention, was not at a uniformly equal distance throughout its extent with the outer surface of the transparency. Consequently, when the laminated transparency had the outer portion of its reinforcing insert secured to the mounting frame, stresses were established.

Some of the results of these stresses during use of an aircraft containing panels produced in the manner of the prior art included failure of the seal between the transparency and its mounting frame. This allowed moisture to penetrate between the outer portion of the reinforcing insert and the mounting frame. It also caused delamination of the elements of the transparency which are subject to weakening of the bond therebetween when subjected to moisture. Furthermore, the inner surface of the outboard sheet is usually provided with a transparent electroconductive coating and a pair of bus bars. Solder joints between the bus bar and lead wires can become blackened and discolored which indicates degradation of the solder joints due to the moisture penetration. Also, moisture tends to attack the electroconductive coating as is evidenced by increased resistance between bus bars and eventual electrical arcing. Another problem found in some aircraft panels made according to the prior art method described previously is that the resulting panels have less structural rigidity than is required to avoid a tendency for the panels to permit moisture to penetrate and enhance delamination of the panel elements.

An examination of a laminated windshield inspected after field use indicated that the reinforcing insert was in a plane non-parallel to the outer surface of the laminated transparency. This non-parallelism of the reinforcing insert relative to the outer glass surface was both parallel to the length and across the width of the reinforcing insert.

A proposed solution for the above problem involved making the mounting frame and the metal insert as a unitary structure. The cost of milling such a complicated structure is so great as to render this proposal impractical.

A different method of fabricating window panels comprising a metal mounting frame enclosing a transparency having a metal reinforcing insert extending from an inner portion within an interlayer thereof to an outer portion that is attached to the mounting frame was believed necessary to avoid the problems that existed prior to the present invention.

DESCRIPTION OF THE PRIOR ART

The following patents were cited in a novelty search. None of these patents disclose the method of fabricating a window panel that forms the basis of the present invention.

U.S. Pat. No. 2,511,168 to Martin et al deals with the use of multiple layers of woven wire screen mounted to the edge of a plastic windshield that may be a single layer windshield or a laminated windshield. Such a device is used as a mounting device for aircraft members.

U.S. Pat. No. 3,061,490 to Ryan discloses a two ply glass laminated safety window that uses a pigmented silicone as an edge material.

U.S. Pat. No. 3,248,273 to Boicey deals with a method used to apply a vapor barrier to a windshield having a silicone interlayer for use in a high-speed aircraft. This material used as the interlayer would be subject to catastrophic attack by sulfur dioxide and has to be completely sealed in order to provide a service life of reasonable length.

U.S. Pat. No. 3,259,345 to Martignoni et al discloses a double walled windshield enclosure for high-speed aircraft in which the outer wall is oriented to minimize surface drag and the inner wall is a stronger structural member which encloses the pressurized crew compartment. A titanium frame is attached directly to a glass surface using a special ceramic adhesive consisting essentially of a lead boro-silicate glass. The attachment material is selected for its coefficient of expansion, which provides a close match with the other components of the edge mounting structure.

U.S. Pat. No. 3,317,710 to Boicey et al relates to laminated safety glass windows having metal inserts that are unitary constructions comprising a mounting frame of a relatively heavy cast or extruded formation with its inner margin embedded in the plastic interlayer and its outer margins forming the mounting flange for the complete unit. Such unitary constructions are impractical because they are both difficult and costly to fabricate to the exact dimensions required. As a consequence, it has been customary for aircraft windows and other transparencies provided with metal inserts to fabricate said aircraft windows and transparencies using metal inserts and mounting frames that were separate elements that were bolted together when the fabricated window or transparency was mounted in an aircraft frame.

U.S. Pat. Nos. 3,410,739 and 3,616,122 to Orcutt describe prior inventions of the present inventor relating to aircraft panels. These patents disclose various laminated aircraft window panels that incorporate metal inserts for reinforcement purposes. However, they do not provide a method of insuring that the metal reinforcement remains in a particular thickness position where it is applied during the assembly prior to lamination under heat and pressure as taught by the present invention. Instead, these patents relate to various means for providing mechanical and environmental protection to various elements in the vicinity of the edge of laminated windshields.

U.S. Pat. No. 3,885,072 to Zibritosky relates to the adhering of a layer of ductile material to the surface portions of brittle sheet adhesively bonded to a rigid attachment.

U.S. Pat. No. 3,919,022 to Stefanik discloses laminated window panels provided with a pair of molded fiber glass reinforced extensions of resinous material adhered to and overlapping both sides of each glass panel in the laminated glass plastic panel. The extensions are applied in the uncured state so that the window panels that have edge portions which are out of desired contour with that of the frame in which the window is to be installed can be molded to a shape that conforms to the laminated window at its inner portion and a shape that conforms to the slightly different contour of the molded pressing frame that surrounds the laminated windshield.

U.S. Pat. No. 3,953,630 to Roberts et al provides a laminated window having an insert with an inner portion of a woven flexible material with no thermal conductivity embedded in an interlayer and is provided with an outer portion that comprises a flexible portion adjacent to the edges of the interlayer and an outer marginal portion which is reinforced with a metal edge component to provide means for attachment of the assembly to the structure of a vehicle. The metal edge component is bonded on after the autoclave cycle by using either an epoxy adhesive or a polysulfide rubber sealing material. There is no rigid metal reinforcement within the interlayer of this structure.

SUMMARY OF THE INVENTION

In its broadest aspect, the present invention comprises a method of fabricating a laminated transparency panel having a rigid mounting frame surrounding a laminated transparency provided with transparent elements and also including a metal reinforcing insert having an inner portion embedded therein and an outer portion bonded to said rigid mounting frame comprising first bonding the outer portion of said insert to said frame to form a sub-assembly with the inner portion of said insert extending inwardly of said frame, thereby enabling the bond between said frame and said outer portion of said insert to reinforce the inner portion of said insert, then assembling the elements of said laminated transparency to the inner portion of said insert, and laminating said assembly so formed with minimum movement of said inner portion relative to the thickness of said transparency elements during said latter laminating step.

According to the present invention, the outer portion of the metal reinforcing insert of the transparency is first laminated to a relatively thick, rigid mounting frame, with a thermosetting structural bonding tape between the aligned surfaces of the outer portion of the reinforcing insert and the rigid mounting frame. The lamination produces a rigid member that enables the inner portion of the reinforcing insert to resist distortion from its original configuration when subjected to an additional autoclave cycle used to complete fabricating the window panel comprising the rigid mounting frame and its attached transparency.

The elements of the transparency, which normally includes at least two glass sheets bonded together by an interlayer of polyurethane or of plasticized polyvinyl acetal into which the inner portion of the reinforcing insert is embedded, are assembled to the preassembly of rigid mounting frame and insert. The interlayers are assembled by applying several plies of the proper outline shape and size to conform to the size of adjacent glass sheets with additional intermediate plies of interlayer material of proper outline shape and size assembled within the inner periphery of the reinforcing insert. The resulting assembly of mounting frame and transparency elements is then subjected to a conventional autoclave cycle. The rigidity of the mounting frame retards movement of the inner portion of the metal reinforcing insert relative to the interlayer and, therefore, to remain comparatively fixed in position relative to the mounting frame. Thus, the parallel relationship of the major surfaces of the inner portion of the metal reinforcing insert and the outer surface of the transparency is maintained during the autoclave cycle. As a result, stresses that tend to cause delamination of the panel during service because of any mismatch in shape between the mounting frame and the insert are minimized.

In contrast, when such windshields were fabricated by laminating the elements of the transparency with the metal reinforcing insert extending outward thereof in a laminating operation under heat and pressure in an autoclave before attachment of the outer portion of the reinforcing insert to the rigid mounting frame, different portions of the reinforcing insert embedded within plies of the interlayer would move different distances within the flexible interlayer plies and would become non-parallel relative to the outer surface of the outer glass ply of the transparency. Movement of the metal insert relative to the thickness of the transparency during lamination in an autoclave necessitated the application of an epoxy resin to build up the inner and/or outer surfaces of the outer portion of the insert to its original dimension. The application of the epoxy build-up to the surface of the outer portion of the metal reinforcing insert was achieved by casting a structural epoxy thereon. After curing, the epoxy required considerable sanding by hand plus many fittings against the outer surface of the rigid mounting frame to obtain the surface parallelism desired between the rigid mounting frame and the outer surface of the built-up outer portion applied to the surface of the outer portion of the metal reinforcing insert.

The method provided by the present invention eliminates the need for the time-consuming casting and hand sanding of the epoxy resin.

The metal reinforcement tended to move in the direction toward the inner glass sheet of a particular production unit because the adjacent inner glass sheet is relatively larger than the outer glass sheet and, hence, more rigid than the outer sheet of the assembly forming the transparency.

The benefits of the present invention will be understood much better in the light of a description of a specific illustrative embodiment which follows.

BRIEF DESCRIPTION OF THE DRAWINGS

In the drawings which form part of the description of the illustrative embodiment and wherein like reference numbers refer to like structural elements, FIG. 1 is a plan view of a pre-assembly of a rigid mounting frame and a metal reinforcing insert that results from the first step of the present method to fabricate a window panel;

FIG. 2 is a sectional view of a contoured pre-assembly of mounting frame and metal reinforcing insert taken along the line 2—2 of FIG. 1;

FIG. 3 is an enlarged fragmentary view of an end portion of the pre-assembly of mounting ring and metal reinforcement of FIGS. 1 and 2 shown mounted over an end portion of a contoured mold; and FIG. 4 is a fragmentary sectional view of an end portion of an assembly of the structural elements of a transparency and the pre-assembly arranged prior to a second laminating step of the fabrication method according to the present invention.

DESCRIPTION OF THE PREFERRED EMBODIMENT

Referring to the drawings, FIG. 1 shows a plan view of a subassembly of a metal reinforcing insert 21 over which is superimposed a rigid, thick, metal mounting frame 23 having mounting apertures 24 spaced around its margin. The outer edge of the metal insert 21 is aligned with the outer edge of the mounting frame 23 and a bonding tape 25, which is preferably pressurized metal adhesive tape comprising fiber glass scrim, aluminum powder, and an epoxy phenolic adhesive conforming to military specification MILA 25.463, and which is commercially available as American Cyanamid HT-432 metal adhesive, is applied to the interfacial portion between the outer portion of the curved metal reinforcing insert 21 and the mounting frame 23 of corresponding curvature. The cross-sectional transverse contour of a specific embodiment of a subassembly of this type is depicted in FIG. 2.

According to the method of the present invention as practiced to fabricate an aircraft panel, a metal reinforcing insert 21 (which is in the form of an aluminum insert about 120 mils (3 mm) thick and previously shaped to approximately its ultimate shape), is mounted on a contoured mold 27 which in shape is parallel to that of the mounting frame 23. A layer of bonding tape 25, whose width equals that of the mounting frame and whose thickness is about 10 mils (0.4 mm), is applied to the upper surface of the outer portion of the reinforcing insert 21 and a shaped mounting frame 23 having a thickness of 290 mils (7.4 mm) is applied to the upper surface of the tape. Under suitable heat and pressure, such as is normally encountered in an autoclave, (such as 200 psi (14 kg/cm$^2$) and 275° to 300° F. (135° to 149° C.)), the mounting frame 23 is bonded to the reinforcing insert 21 and may even have its shape conform more closely to that of the relatively rigid mounting frame. The sub-assembly of mounting frame 23 and metal reinforcing insert 21 depicted in FIGS. 1 and 2 provides a rigid structure that reinforces the inner portion 28 of the metal insert 21 that is incorporated within the laminated transparency of the ultimate panel depicted in FIG. 4.

Of course, it is understood that while the illustrative embodiment of this invention recites a method of forming the sub-assembly that comprises applying the bonding tape 25 to the interfacial portion between the outer portion of the curved metal insert 21 and the mounting frame 23 of corresponding curvature by mounting the insert 21 over the contoured mold 27 and applying the tape 25 to the upper surface of the insert 21 before applying the shaped mounting frame 23 to the upper surface of the exposed tape 25, it would be obvious to accomplish the bonding step by mounting the shaped mounting frame 23 in an upside-down orientation compared to that depicted in FIG. 2 to the upper surface of a mold shaped to a contour complementary to that of contoured mold 27 of FIG. 3, then applying the bonding tape 25 to the upper surface of the upside-down shaped mounting frame 23 and then applying the curved metal insert 21 upside-down to the orientation shown in FIG. 2 over the bonding tape.

The thickness of the components of the sub-assembly is depicted to approximate scale in FIG. 2. In order to show the entire pre-assembly in FIG. 2 on one sheet of drawings, it is impossible to depict the 10 mil thickness of the layer of bonding tape 25 in section against the 290 mil thickness of the mounting frame 23 and the 120 mil thickness of the metal reinforcing insert 21. Even in the greatly enlarged fragmentary thickness view of FIG. 4, it is possible to depict the adhesive layer of bonding tape 25 in section only by exaggeration of its relative thickness compared to the thickness of the other components of the window panel.

The laminated transparency comprises an outer glass ply 29 (approximately 187 mils (4.8 mm) thick having a pair of bus bars fused to its inner surface 30 with a transparent electroconductive film, preferably of a metal oxide such as tin oxide or indium oxide (not shown) interconnecting the bus bars and extending beyond the edge of the transparency for connection to suitable terminal blocks (not shown) in a manner conventional in the art, a first interlayer 31 comprising a plurality of thin plies of polyurethane or plasticized polyvinyl butyral or a composite of one ply of polyurethane adjacent the coated surface 30 and additional plies of plasticized polyvinyl butyral applied thereagainst to provide the first inerlayer with a total thickness of 410 mils (10.7 mm), an intermediate fully tempered glass ply 33 that has a thickness of 750 mils (19 mm), a second interlayer 35 similar to the first interlayer 31 except that it is composed of fewer plies of interlayer material to provide a total thickness of 200 mils (5.1 mm), and an inner glass ply 37 of semi-tempered glass having a thickness of 187 mils (4.8 mm). As seen in FIG. 4, the tempered glass ply 33, the second interlayer 35 and the inner glass ply are larger in extent than the outer glass ply 29 and the outer plies of the first interlayer 31 adjacent the outer glass ply 29 having outliness that match the outline of the outer glass ply 29, the inner plies of the first interlayer 31 have outlines that match the outline of glass plies 33 and 37, while the intermediate plies of the first interlayer aligned with the thickness of the metal reinforcing insert 21 have outlines that conform to the outline of the inner edge of the metal reinforcing insert 21. Two temperature sensing elements (not shown) are embedded in the first interlayer 31 and have lead wires (not shown) extending to beyond the edge of the transparency for attachment to terminal blocks (not shown) in a manner well known in the art.

The elements of the transparency comprising glass plies 29, 33 and 37 and interlayers 31 and 35 are assembled in a manner shown in FIG. 4 within the sub-assembly formed when the mounting frame 23 and the metal reinforcement 21 are rigidly bonded together. It is noted that the outer edge of the outer glass ply 29 and the outer plies of the first interlayer 31 extend around a perimeter that is inboard of the perimeter of the remainder of the plies of the first interlayer 31, the tempered glass ply 33, the second interlayer 35 and the inner glass ply 37, as depicted in FIG. 4. A silicone bumper strip 39 is applied in the space between the mounting frame 23 and the outer perimeter of the outer glass ply 29 and the upper layers of the first inerlayer 31. The silicone bumper strip 39 provides a barrier to the ingress of moisture to the first interlayer 31, and also to the interface between the adjacent surfaces of the outer glass ply 29 and the interlayer 31. The silicone bumper strip preferred is a silicone that vulcanizes at high temperature, and a preferred composition for the silicone bumper strip is sold under the trademark DOW CORNING 1125 V silicone rubber.

The assembly containing the sub-assembly comprising the rigid mounting frame 23 and metal reinforcing insert 21 together with the other elements of the laminated transparency are assembled, and removable filler material, such as cardboard, is temporarily applied to any recessed peripheral portions to provide uniform thickness about its margin. The resulting assembly and said filler material is temporarily taped together, and the resulting assembly is wrapped in overlapped layers of polyvinyl fluoride (sold under the trademark TEDLAR) to form a package. The package is inserted in a laminating bag of the type disclosed in U.S. Pat. No. 3,311,517 to Keslar and Rankin.

The bag used for lamination comprises an outer ply of polyethylene glycol terephthalate, commonly known by the trademark Mylar and an inner ply of polyethylene bonded to the Mylar ply. The bag has a total thickness not exceeding 5 mils (0.127 mm). The bag containing the assembly is evacuated and the evacuated bag sealed. The bag may be inserted within a second outer laminating bag similar in structure to the first laminating bag, if desired, and the second laminating bag is evacuated and sealed. The sealed unit is placed in an air autoclave and exposed to a pressure of 200 psi (14 Kg/cm$^2$) at a temperature of 275° to 300° F. (135° to 149° C.) for 45 minutes. Each unit so treated is cooled in the autoclave with the elevated pressure maintained until the temperature is reduced to 150° F. (65° C.). The pressure is then reduced and the unit removed from the autoclave.

The bag is opened and the assembly removed. The removable material is removed and the resulting panel assembly has its inner portion 28 of reinforcing insert 21 essentially parallel to the outer surface of the outer glass ply 29. The panel assembly is then converted into a finished panel by attaching an inboard metal Z-bar and electrical terminal blocks in the proper locations of the panel assembly in a manner that is well known in the art.

Prior to the present invention, the metal reinforcing insert 21 was first assembled with the other elements of the laminated transparency and laminated under heat and pressure. The interlayer 31 was sufficiently soft that it permitted parts of the metal reinforcing frame 21 to be displaced or distorted in a direction of the thickness of the first interlayer 31 toward the tempered glass ply 33. Such distortions made it difficult to obtain a flush mounting between the outer portion of the metal reinforcing insert 21 and the mounting frame 23.

The extra thickness of the mounting frame 23 (290 mils) of the preassembly reinforces the insert 21 prior to final assembly and lamination of the elements of the transparency. Such reinforcement reduces the tendency of the metal reinforcing insert 21 to tilt or wrap either longitudinally or transversely of its perimeter length during the subsequent lamination with the elements of the transparency surrounded by the frame that comprises the mounting frame 23 and the outer portion of the metal reinforcing insert 21. Hence, the resulting panel is relatively free of stresses that cause delamination of the transparency, optical distortion, and degredation of the electrical circuit elements.

In order to provide a comparative evaluation of a windshield produced according to the present invention (hereafter called laminate #2) compared to one produced by the prior art technique in which the transparency is laminated with its metal insert prior to building up the thickness of the outer portion of the insert with epoxy resin and attaching the built-up outer extension portion of the insert to the mounting frame (hereafter called laminate #1), the following tests were performed with the results enumerated.

In a standard proof pressure test, both types of windshields conforming to laminate #1 and laminate #2 were installed in a pressure vessel and pressurized to 12.5 psig. This pressure was maintained for 15 minutes with no loss of pressure. Each windshield was evaluated to determine the effects of pressurization. Laminate #1 showed a small amount of delamination upon initial pressurization which remained constant throughout the test. The delamination was outside the vision area of the laminate. There was no measurable loss of pressure in laminate #1. There was neither loss of pressure nor any delamination observed in laminate #2 resulting from its standard proof pressure test.

Then, each laminate was subjected to a heat soak pressurization test which involved placing the laminate within the pressure vessel, which was placed within an oven. Each laminate was subjected to an oven temperature of 130° F. and then pressurized at 18.8 psig and held at these conditions for 30 minutes. Both laminates passed the heat soak pressurization test as they exhibited no detrimental effects from pressurization and no measurable loss of pressure.

The laminates were subjected to a so-called cyclical power/pressurization test involving 2100 pressure cycles from zero pressure differential to 10 psig pressure differential while maintaining an outside temperature of −65° F. and an inside temperature of 70° F. with power applied to the electroconductive coating on the inner surface of the outer glass sheet. This test was interrupted after each 700 cycles (zero to 10 psig to zero) for inspection. Both test laminates performed well electrically, pressurization parameters were maintained and no detrimental effects were noted on either laminate #1 or laminate #2.

The two laminates were subjected to an applied load of 12.5 psig and measured for deflection at seven bolt hole locations A, B, C, D, E, F and G (see FIG. 1) around the periphery of the outboard glass ply and in the center of the laminates (see H, FIG. 1) while subjected to such a pressure differential. The measured deflections are recorded in the following table.

| Location | DEFLECTION MEASUREMENTS (mils) | |
|---|---|---|
| | Laminate #1 (Prior Art) | Laminate #2 (This Invention) |
| A | 30 | 15 |
| B | 20 | 16 |
| C | 18 | 15 |
| D | 57 | 31 |
| E | 42 | 28 |
| F | 12 | 10 |
| G | 25 | 20 |
| H | 98 | 69 |

The results indicate a definite superiority of the rigidity of laminate #2 compared to that of laminate #1 and no significant difference between the results of the other tests performed on the two test laminates.

The form of the invention as shown and described in this specification represents an illustrative preferred embodiment thereof. It is understood that various changes may be made, such as the specific manner of bonding the metal insert to the mounting frame and the manner of supporting the metal insert and the mounting frame during said bonding, without departing from the gist of the invention as defined in the claimed subject matter which follows.

What is claimed is:

1. A method of fabricating a curved, laminated transparency panel having a curved, rigid mounting frame surrounding a curved, laminated transparency provided with transparent elements and also including a curved, metal reinforcing insert having an inner portion embedded therein and an outer portion bonded to said frame comprising first applying bonding means to an interfacial surface between said frame and said insert, then assembling said frame and said insert on opposite sides of said bonding means to bond the outer portion of said insert to said frame to form a curved sub-assembly with the inner portion of said curved insert extending inwardly of said curved frame, thereby enabling the bond between said curved frame and said outer portion of said curved insert to reinforce the inner portion of said insert, then assembling the elements of said curved, laminated transparency to the inner portion of said curved insert, and laminating said curved assembly so formed with minimum movement of said inner portion relative to the thickness of said transparency elements during said latter laminating step.

2. A method as in claim 1, wherein said laminated transparency comprises an interlayer comprising a plurality of plies of a flexible, compressible composition selected from the group consisting of polyurethanes and plasticized polyvinyl acetals, wherein certain plies of said interlayer are applied in alignment with the thickness of said insert and other plies of larger extent than said certain plies are applied against said certain plies and their extended portions are in alignment with the major surfaces of the inner portion of said insert in the direction of the thickness of said insert during said assembling step.

3. A method as in claim 2, wherein said transparent elements comprise an outer glass sheet whose periphery is aligned with said metal insert relatively close to the inner edge of said insert and an inner glass sheet whose periphery is aligned with said metal insert a greater distance from the inner edge of said insert, including applying plies of said interlayer whose periphery is aligned with that of said outer glass sheet to one side of said certain interlayer plies and said inner portion of said insert and with said outer glass sheet to the outer side of said latter plies, and applying plies of said interlayer whose periphery is aligned with that of said inner glass sheet to the other side of said certain interlayer plies and said inner portion of said insert and with said inner glass sheet to the other side of said last named plies.

4. A method as in claim 1, wherein said mounting frame is shaped to conform to a portion of an airplane fuselage and said insert is shaped to have its outer portion conform to the shape of said shaped mounting frame.

5. A method as in claim 1, comprising applying said bonding means in the form of a bonding tape to an interfacial surface between said rigid mounting frame and said outer portion of said insert to form said sub-assembly and subjecting the sub-assembly so formed to elevated heat and pressure to effect said bonding step.

6. A method as in claim 4 or claim 5, wherein said insert and said mounting frame are shaped to approximately conforming shapes prior to said bonding step and said insert is shaped to conform to said mounting frame more exactly during said bonding step.

7. A method as in claim 5, wherein said bonding tape applied is a thermosetting tape.

8. A method as in claim 7, wherein said tape is applied to the interfacial portion between the outer portion of said curved metal reinforcing insert and said curved mounting frame.

* * * * *